US011544720B2

(12) United States Patent
Bhosale et al.

(10) Patent No.: US 11,544,720 B2
(45) Date of Patent: Jan. 3, 2023

(54) CLIENT MANAGER AND ROUTER

(71) Applicant: Bank of America Corporation, Charlotte, NC (US)

(72) Inventors: Chetan Bhosale, Edison, NJ (US); Kelly A. Shinnick, La Grange, IL (US); Krishna G. Kutty, Bridgewater, NJ (US); Daiying Chen, New York, NY (US); Lauren Michele Northrop, New York, NY (US); Joseph Schinasi, Jersey City, NJ (US); Marc Winters, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 207 days.

(21) Appl. No.: 16/693,804

(22) Filed: Nov. 25, 2019

(65) Prior Publication Data
US 2021/0158367 A1 May 27, 2021

(51) Int. Cl.
*G06Q 30/00* (2012.01)
*G06Q 10/10* (2012.01)
(Continued)

(52) U.S. Cl.
CPC ....... *G06Q 30/016* (2013.01); *G06F 16/2455* (2019.01); *G06F 40/279* (2020.01);
(Continued)

(58) Field of Classification Search
CPC .... G06Q 10/107; G06Q 30/016; G06Q 50/18; G06F 16/2455; G06F 16/9535;
(Continued)

(56) References Cited

U.S. PATENT DOCUMENTS 6,496,852 B1 12/2002 Yamaguchi
6,567,840 B1 5/2003 Binns et al.
(Continued)

OTHER PUBLICATIONS

"Chat Transcript Fields," https://help.salesforce.com/articleView?id=live_agent_transcript_fields.htm&type=5, Sales Force, Retrieved on Oct. 2, 2019.

(Continued)

*Primary Examiner* — Anh Nguyen
(74) *Attorney, Agent, or Firm* — Weiss & Arons LLP

(57) ABSTRACT

A method for managing and routing client queries within an entity is provided. The method may include receiving a client query including origination identification data associated with a sender of the client query. In response to searching in a database for history correlating to the origination identification data, determining that no relevant history exists with respect to the origination identification data. The method may include identifying the sender by identifying, within the query, a first character string identical to a first keyword stored in a classification model within a database, using the first keyword to identify a second character string that includes the first keyword in addition to other characters, identifying, from a list of sub-entities, a sub-entity associated with the first keyword and using a combination of the first keyword, the sub-entity and one or more attributes to identify the sender as an existing client.

14 Claims, 5 Drawing Sheets

(51) Int. Cl.
*G06Q 50/18* (2012.01)
*G06F 16/2455* (2019.01)
*G06F 40/279* (2020.01)
*H04L 61/3015* (2022.01)
*H04L 67/303* (2022.01)
*H04L 61/5007* (2022.01)
*H04L 101/37* (2022.01)

(52) U.S. Cl.
CPC ............ *G06Q 10/107* (2013.01); *G06Q 50/18* (2013.01); *H04L 61/3025* (2013.01); *H04L 61/5007* (2022.05); *H04L 67/303* (2013.01); *H04L 2101/37* (2022.05)

(58) Field of Classification Search
CPC ............... G06F 40/279; H04L 61/2007; H04L 61/3025; H04L 61/307; H04L 67/2814; H04L 67/30; H04L 67/327
USPC ........................................................ 705/304
See application file for complete search history.

(56) References Cited

U.S. PATENT DOCUMENTS

| | | | |
|---|---|---|---|
| 7,330,822 | B1 | 2/2008 | Robson et al. |
| 7,747,966 | B2 | 6/2010 | Leukart et al. |
| 7,765,212 | B2 | 7/2010 | Surendran et al. |
| 7,970,791 | B2* | 6/2011 | Liao ........................ G06F 16/93 707/791 |
| 8,381,088 | B2 | 2/2013 | Kikin-Gil et al. |
| 8,490,015 | B2 | 7/2013 | Brychell et al. |
| 8,549,520 | B2 | 10/2013 | Stoitsev et al. |
| 8,713,144 | B2 | 4/2014 | Rhodes et al. |
| 9,098,834 | B2 | 8/2015 | Ramanathaiah et al. |
| 9,165,283 | B2 | 10/2015 | Scheidl et al. |
| 9,477,945 | B2 | 10/2016 | Wu et al. |
| 10,255,566 | B2 | 4/2019 | Gruber et al. |
| 2011/0092153 | A1* | 4/2011 | Patron ..................... H04L 45/00 455/3.01 |
| 2013/0317954 | A1* | 11/2013 | Psota ..................... G06Q 40/02 705/30 |
| 2017/0039282 | A1* | 2/2017 | Krishnaprasad ...... G06F 16/248 |
| 2017/0359420 | A1* | 12/2017 | Ives-Halperin ......... H04L 67/14 |
| 2019/0065576 | A1* | 2/2019 | Peng .................. G06F 16/3329 |
| 2019/0199745 | A1* | 6/2019 | Jakobsson ........... H04L 63/1433 |

OTHER PUBLICATIONS

"Mercury Mail Transport System," https://en.wikipedia.org/wiki/Mercury_Mail_Transport_System, Wikimedia Foundation,. Inc., Jul. 25, 2019.

"Regular Expression," https://en.wikipedia.org/wiki/Regular_expression, Wikimedia Foundation, Inc., Sep. 21, 2019.

Jonny Fox, "Regex Tutorial-A Quick Cheatsheet by Examples," https://medium.com/factory-mind/regex-tutorial-a-simple-cheatsheet-by-examples-649dc1c3f285, Factory Mind, Jun. 23, 2017.

"What is an Email Header?" htps://whatismyipaddress.com/email-header, What Is My IP Address, Retrieved on Sep. 24, 2019.

* cited by examiner

CLIENT MANAGER AND ROUTER

FIELD OF TECHNOLOGY

Aspects of the disclosure relate to client queries received within an entity. Specifically, aspects of the disclosure relate to managing and routing client queries received within the entity.

BACKGROUND OF THE DISCLOSURE

Entities often provide an internet-based client-service framework for each client to access relevant information and documents within their online account associated with the entity. Servicing clients within an entity's internet based client-service framework is significant for the success of the client/entity relationship and functionality.

In a client-service framework, clients may be able to view and manage their transactions, reports and shared documents. Clients may also be able to submit queries to the entity via the client-service framework. The queries may include a request, a question and/or a comment. These queries may be submitted via an email, live chat or any other suitable communication platform. The entity handling the receipt of the queries may need to identify the line of business ("LOB") that the query is related to and then redirect the query to the most appropriate team within the entity.

Often, these queries do not include the proper identification to enable the entity to easily identify what the client is requesting. Additionally, these queries do not always include a clear indication of which individual and/or client is sending the query. Furthermore, entities may receive many queries at a time from various different clients. Each of these queries may require immediate attention.

It would be desirable, therefore, to have systems and methods for systematically and accurately identifying an originator of incoming queries, type of requests associated with the queries and routing the queries to an appropriate location within the entity.

SUMMARY OF THE DISCLOSURE

Aspects of the disclosure relate to a client case management system (referred to alternately hereinafter as a "system") for managing client requests. The system may be any suitable server, processor, computer network and/or cloud computing device.

The client case management system may include a receiver. The receiver may be configured to receive a client query. The client query may be an email. The client query may be a chat message.

The client query may include one or more attributes including an internet protocol ("IP") address of the sender, a domain name and one or more email addresses included in a distribution group of the client query. The client query may also include a request that may include character strings. The client query may also include origination identification data associated with a sender of the client query.

The system may also include a processor. The processor may be configured to extract the origination identification data. The processor may also be configured to search in a database for query history that may correlate to the origination identification data. In response to the search, the processor may be configured to determine that no query history exists with respect to the origination identification data.

In response to determining that no relevant history exists with respect to the relevant client, the processor may be configured to perform a sequence of actions in order to identify the sender. The sequence of actions may include comparing each keyword, from within a classification model of previously stored keywords, against each character string comprised in the request. Following the comparing, the sequence of actions may include identifying, within the request, a first character string identical to a first keyword stored in the classification model.

Furthermore, the sequence of actions may include using the first character string to search within the query for each additional character string that includes the first character string.

Following the searching, storing the first character string and each character string that includes the first character string as a first dataset.

The sequence of actions may further include identifying, from the database comprising a list of sub-entities, where each of the sub-entities may be associated with one or more keywords, a sub-entity associated with the first keyword. Then using a combination of the first keyword, the sub-entity and the one or more attributes, identifying the sender as an existing client.

The processor may further be configured to update an already existing profile of the legacy client to include the originating client.

The system may also include a transmitter. The transmitter may be configured to transmit the client query, based on the determined type of request and the identified originating client, to a sub-entity predetermined to handle the type of request.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
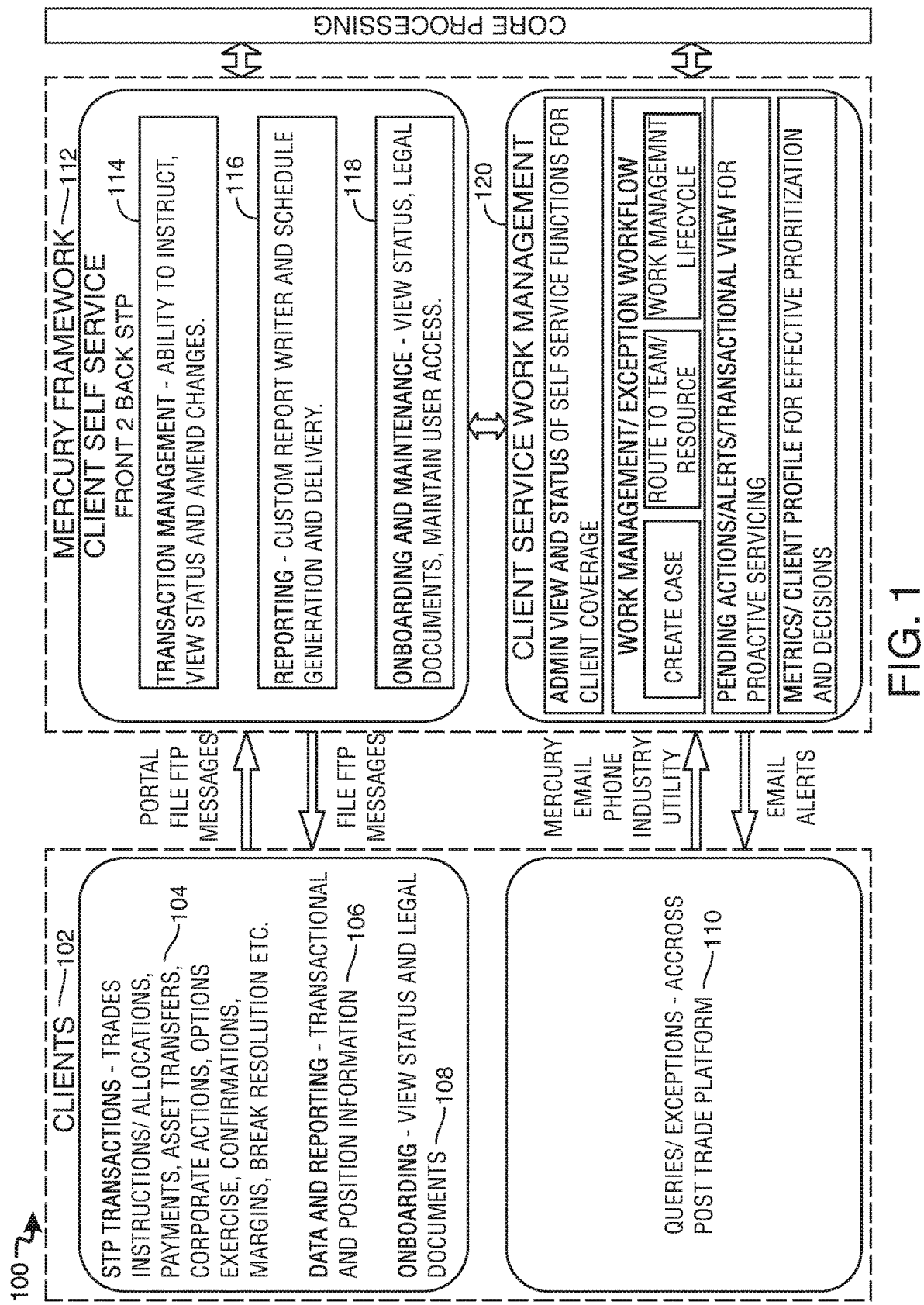
FIG. 1 shows an illustrative system architecture in accordance with principles of the invention.

Systems and methods are provided for managing and routing client queries within an entity. The method may include receiving a client query. The client transmitting the query may be an individual. The client transmitting the query may be an organization. The client query may include origination identification data associated with a sender of the client query.

The client query received may be in the form of an email. The email may be directly transmitted from the organization to the entity's system framework. The email may be transmitted from an individual's personal inbox i.e.—outside the organizations mail server, to the entity's system framework. When the client query is an email, the origination identification data associated with the sender, may be an email address of the sender.

In some embodiments, the client query may be received as a chat message. The chat message may be live. The chat message may be an instant message. In other embodiments, the query may be transmitted from the client, via an electronic form on the entity's system framework. When the client query is a chat message, the origination identification data may be a name of the sender of the chat message.

The query may be received from a prospective client. The query may be received from an already existing client. However, in one embodiment, the name and/or email address of the client transmitting the query may not be found in the system. The client may not be found in the system because the client may be transmitting the query from an email address that may be different than the email address associated with the client's personal account. The client may not be found in the system because the name may not be the exact name associated with the client's personal account profile.

In order to be enabled to easily and quickly identify the client transmitting the query, the system may use a combination of one or more other attributes that may be included within the client query in order to identify the client. When the one or more other attributes do not assist in identifying the client associated with the query, the client may then be determined to be a prospective new client.

One attribute included in the client query may include one or more additional email addresses that the sender included in the query. The additional email addresses may have been a part of a distribution group. The sender may have copied additional co-workers on the query. The sender may have copied family members on the query. Client profiles within the entity may include email addresses that may be associated with the client. The system may be enabled to identify the sender of the client query by matching the additional email addresses with email addresses stored in already existing client profiles.

Another attribute may be an internet protocol ("IP") address associated with the client sending the query. The system may be configured to search a record of IP addresses to identify the sender of the client query.

Another attribute may include a name and/or email address included in a recipient field of the query. Another attribute may be a domain name associated with the email address of the sender.

The client query may also include a request. The request may include a plurality of character strings describing the type of request included in the query. Each character string within the client query may be a single word. The word may include alphabetical characters, numeric characters, emoticons, symbols and/or any other characters.

The request may be a question for information. The request may be a comment. The request may be associated with a previous purchase. The request may be associated with a prospective purchase. The request may be time sensitive. Additionally, the request may be from a prospective client. The request may be from an already existing client.

Clients that already exist in the system may have been assigned a priority level when the client became a member of the entity. The priority levels may be assigned based on one or more pre-determined factors determined by the entity. Some clients may a first-tier client. Other clients may be a second-tier clients. In some embodiments, first-tier clients may be enabled to receive priority over second-tier clients. In other embodiments, second-tier clients may be enabled to receive priority over first-tier clients. It should be appreciated that the priority levels of each client may dynamically change over time.

Upon receipt of the client query, the method may include searching in a database for query history correlating to the origination identification data. The searching may be in order to determine if the originating client sending the query is an already existing client within the system. The searching may include, searching for one or more historical emails and/or chat messages that may have been received from an email address that matches an email address included in the client query. The searching may include, searching for one or more historical emails and/or chat messages that may have been received from the same name as the name included in the sender field of the client query. The searching may further assist in identifying an existing client wherein the profile of the existing client includes a list of co-worker email addresses that match the email addresses included in the client query.

The method may further include determining that no relevant history exists with respect to the originating client. In response to determining that no relevant history exists with respect to the origination identification data, the method may further include, performing a sequence of action in order to identify the sender of the client query. The sequence of actions may include comparing each keyword, from within a classification model of previously stored keywords, against each character string comprised in the request. The comparing may be for finding an identical match. The keyword search may assist in identifying the client sending the query. The keyword search may also assist in identifying a sub-entity within the entity that may best handle responding to the client query.

The method may include identifying, within the request, a first character string identical to a first keyword stored in the classification model. The classification model of keywords may be a machine learning model stored in the database. The classification model of keywords may include a list of keywords that describe the entity. The keywords may include words that describe each sub-entity. When the entity is a banking application, the keywords may include terms such as account, balance, transaction, loan, borrow, lend, mortgage, trade and stock. Each keyword may include a list of sub-keywords that may have a similar meaning to the keyword but may be in a plural form or may be a synonym to the keyword. For example, the word 'trade' may be a keyword. The sub-keywords that may be included in the keyword 'trade' may be 'trading' and 'trades.'

In order to get a most accurate result on the type of request included in the client query, searching for an exact match of the keywords may be the most accurate. Once an exact match to the keyword is found, the method may include searching for additional character strings that include the keyword but may not be limited to only the keyword. Each additional character string may be a character string that includes the first keyword and additional characters. The additional characters may be American Standard Code for Information Interchange ("ASCII") characters. The additional characters may include non-ASCII characters. The additional characters may include alphanumeric characters.

The method may execute an algorithm to find an exact match to the keyword. The method may be implemented using JAVA® string utilities to check the existence for one or more character strings that match the keywords. Each keyword stored in the classification model may be searched using a full word search. The full word search may be a search where the keyword may be enclosed with quotation marks to prevent special characters from within a character string from impacting the search. For example, a keyword may be associated with a line of business ("LOB") within the entity. The LOB may be referred to as 'RAI'. The client query may include the LOB name 'RAI' in a subject line of the request. By searching for an exact match, the results returned may be more accurate. When performing a full word search on the keyword 'RAI', false positive results such as words that may include the characters 'RAI' may be avoided. Character strings such as 'bRAIn' and 'tRAIn' may be avoided.

The algorithm may iterate through every keyword checking for the occurrence in the email subject. If the keyword is tagged for partial search, then any occurrence of the search string is considered a match. If the keyword is tagged for full word search, then the keyword is searched in quotes to prevent special characters from within the string to impact the search.

In this embodiment, the algorithm may iterate through each keyword checking for a full word search. For each character string returned that is identical to the keyword, the algorithm may then use a 'regular expression' to identify character strings that may be similar to the keywords but may not be an exact match.

An exemplary command that may be used to search a string may be: (?i).*?\\bREPLACE_KEY\\b.*

After an identical match is found, the characters REPLACE_KEY may be replaced with the keyword that is identical to one or more character strings and regular expression is used to do the search. The above mentioned regular expression may return any character string that includes, within the character string, any one or more additional characters before the keyword and after the keyword. This method of searching first for identical matches and then further searching for similar matches to the identical matches may be an optimal method because the algorithm may be very simple to implement and result in quick and accurate results.

Following the searching, the method may include storing the first character string and each character string that includes the first character string as a first dataset.

Based on the first keyword, the method may be enabled to determine the sub-entity that may be responsible to handle the client query. The method may include identifying from the database that includes a list of sub-entities and one or more keywords associated with each sub-entity, a sub-entity associated with the first keyword.

In one embodiment, following the identification of the first keyword, the method may include identifying a plurality of keywords identical to a plurality of additional character strings comprised in the client query. The method may use a combination of the plurality of additional character strings in order to determine the most appropriate sub-entity for handling the client query.

Since entities are very often flooded with queries the client queries may be easily misplaced and/or directed to the wrong sub-entity. In order to mitigate the mishandling of the client queries, the method may query a database storing a plurality of sub-entities where each of the sub-entities may be associated with one or more keywords. The keywords included in the client queries may match keywords associated with a plurality of sub-entities. Therefore, the method may further include identifying a sub-entity within the database associated with a greatest amount of identical keywords. The method may further include transmitting the client query to the sub-entity with the greatest amount of identical keywords to handle the request. This may mitigate incoming client queries from having to be forwarded from one sub-entity to one or more other sub-entities prior to being handled.

In another embodiment, the method may scan the database for a historic query that may include an amount of character strings that may be identical to an amount of character strings included in the client query. The amount of identical character strings may be greater than a pre-determined threshold amount. The method may also include automatically routing the client query to a sub-entity that handled the historic query.

The method may further include using a combination of the first keyword, the sub-entity identified to handle the client query, and the one or more attributes in order to identify the sender as an existing client. The method may implement machine learning to combine different attributes of the query along with the identified information to find a match in the database. The combination of each of the first keyword, the sub-entity and attributes may enable finding an already existing client to be the same person as the person sending the client query. The one or more attributes that may assist in identifying who the sender may be additional email addresses that the client query was sent to. The method may be enabled to the same email addresses included in an already existing client's profile and may use that attribute combined with a domain name included in the senders email address and the first keyword identifying the type of request to identify the sender as an existing client.

The method may further include searching on the internet to find out information associated with the origination identification data included in the client query. An internet search may return results that may provide further identification of the sender that may match data included in the profile of an already existing client. The internet search may return a residing address associated with the origination identification data of the sender. The method may compare the residing address to home addresses included in each existing client's profile. The method may further include identifying within the database, an existing client that includes a home address that matches the residing address.

Once the sender is determined to be an already existing client of the entity, the method may include updating a profile of the existing client to include the origination identification data associated with the sender.

Prior to updating the profile of the existing client, the method may further include transmitting a notification to the existing client. The notification may include origination identification data and a request for an authentication password associated with an account of the existing client. Following the transmittal of the notification, the method may include receiving the authentication password and confirming the sender as the existing client.

The method may also include prioritizing the client query from amongst a plurality of client queries based on pre-determined factors including time-sensitivity of the client query and a rating level of the identified originating sender.

In another embodiment a method for managing and routing a plurality of client queries within an entity is provided. The method may include receiving the plurality of client queries. Each of the client queries may include a request. Each of the client queries may also include origination identification data associated with the client. The method may include identifying an existing client associated with each client query based on the origination identification data.

For each client query the method may include comparing each keyword, from within a library of previously stored keywords, against each character string included in the request. The method may further include identifying, within the request, a first query character string identical to a first keyword stored in the library.

Using the first character string the method may include searching for each additional query character string that includes the first character string. The method may also include storing the first identified character string and each character string that includes the first identified query character string as a first dataset.

The method may further include identifying, from a database comprising a list of sub-entities wherein each of the sub-entities is associated with one or more keywords, a sub-entity associated with the first keyword. The method may also include assigning the sub-entity for handling the request associated with the client query.

Each client query may include a plurality of components. The method may include assigning a score to each of a plurality of components of the client query. The method may also include assigning a priority level for each client query based on the assigned score.

The components may include a time-sensitivity of the client query and a predetermined status of the client. The time-sensitivity of the client query may be determined by searching the client query for a due date associated with the type of request that is before a predetermined future date. When the due date is determined to be equal to or before the predetermined future date, the time sensitivity component may be assigned a higher score. When the due date is determined to be after the predetermined future date, the method may include assigning a lower score to the time-sensitivity component.

The time-sensitivity may also be determined by identifying whether there may be a risk in the event that the request may not be responded to within a pre-determined amount of time.

The pre-determined status of the client may be a status assigned to each client when the client enrolled as a member of the entity. The status may dynamically change over time. The client may be a first-tier client. The client may be a second-tier client. In one embodiment, the first-tier clients may receive a higher score then the second-tier clients.

In another embodiment, when a first plurality of client queries are identified to be received from a first-tier client and a second plurality of client queries are identified to be received from the second-tier clients, the method may include determining a due date associated with each of the first and second plurality of client queries. When the due date is after the predetermined future date, the method may include assigning a higher priority level to the client queries received from first-tier clients and a lower priority to the client queries received from second-tier clients.

When the client query includes the pre-determined status of the client and does not include a due date, the method may include assigning a higher priority level to the client query that includes the first-tier client and a lower priority to the client query includes the second-tier client.

For each sub-entity, the method may include ordering the plurality of client queries assigned to the sub-entity. The ordering may be based on the priority level of each client query.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows illustrative client-services framework 100 associated with an entity. In framework 100, the entity for which framework 100 has been initiated for may be a banking entity. The framework 100 may include a front-end 102 and a back-end 112. The framework may support a Mercury mail transport system ("MTS".) The framework may support any other suitable MTS.

Framework 100 may alternatively be used for different business applications, such as for retail, food industry, organizations and any other suitable business.

The front-end 102 may be a graphical user interface ("GUI") for clients to view account related information and to perform transactions. Framework 100 may include a variety of tools the entity may offer for the clients use. The front-end 102 may include a straight-through-processing ("STP") transaction tool 104 enabling clients to perform transactions within the trades, payments asset transfers, corporate actions, options exercise, confirmations, margins and break resolution. Front-end 102 may also include a data and reporting tool 106. Front-end 102 may also include an onboarding tool 108 enabling clients to view legal documents and the status of the legal documents.

Tools 104, 106 and 108 may transmit the inputted data to the back-end 112 via file transfer protocol (FTP") messaging. Back-end 112 may include a transaction management application 114 for managing the transaction data received from STP transaction tool 104. Transaction management application 114 may have the ability to instruct, view the status and amend changes. Reporting application 116 may receive data from data and reporting tool 106 and may be enabled to write custom reports and further generate a scheduler for generating the reports and delivering the reports. Additionally, onboarding and maintenance application 118 may receive data from onboarding tool 108 and may manage the legal documents, enable the viewing of the status of the legal documents and maintain user access to the legal documents.

The front-end 102 may also include a tool for enabling clients to submit queries including questions and comments, as shown at 110. Client service work management 120 may manage the workflow of the incoming questions and comments. The queries may be transmitted via email, chat message or via any other suitable messaging application. For each query, the workflow may include creating a case identification for the query, determine the appropriate team and/or resource for handling the query and transmit the query to the appropriate team. The framework may also include machine learning for tracking each case and the assigned team and using the data and attributes included in the query to enable identifying and auto-routing additional incoming queries with similar attributes.

The client service work management 120 may also include a metrics system for effective prioritization and decisions for each client query. The metrics system may score each query based on the time-sensitivity associated with the query. The metrics system may further score each query based on the priority level of the client. The priority level may be based on a number of purchases/transactions the client may have transacted within the entity. Queries may be forwarded to the appropriate sub-entity to handle the query. Queries may be responded to by the sub-entity based on the assigned score.

Figure 2:
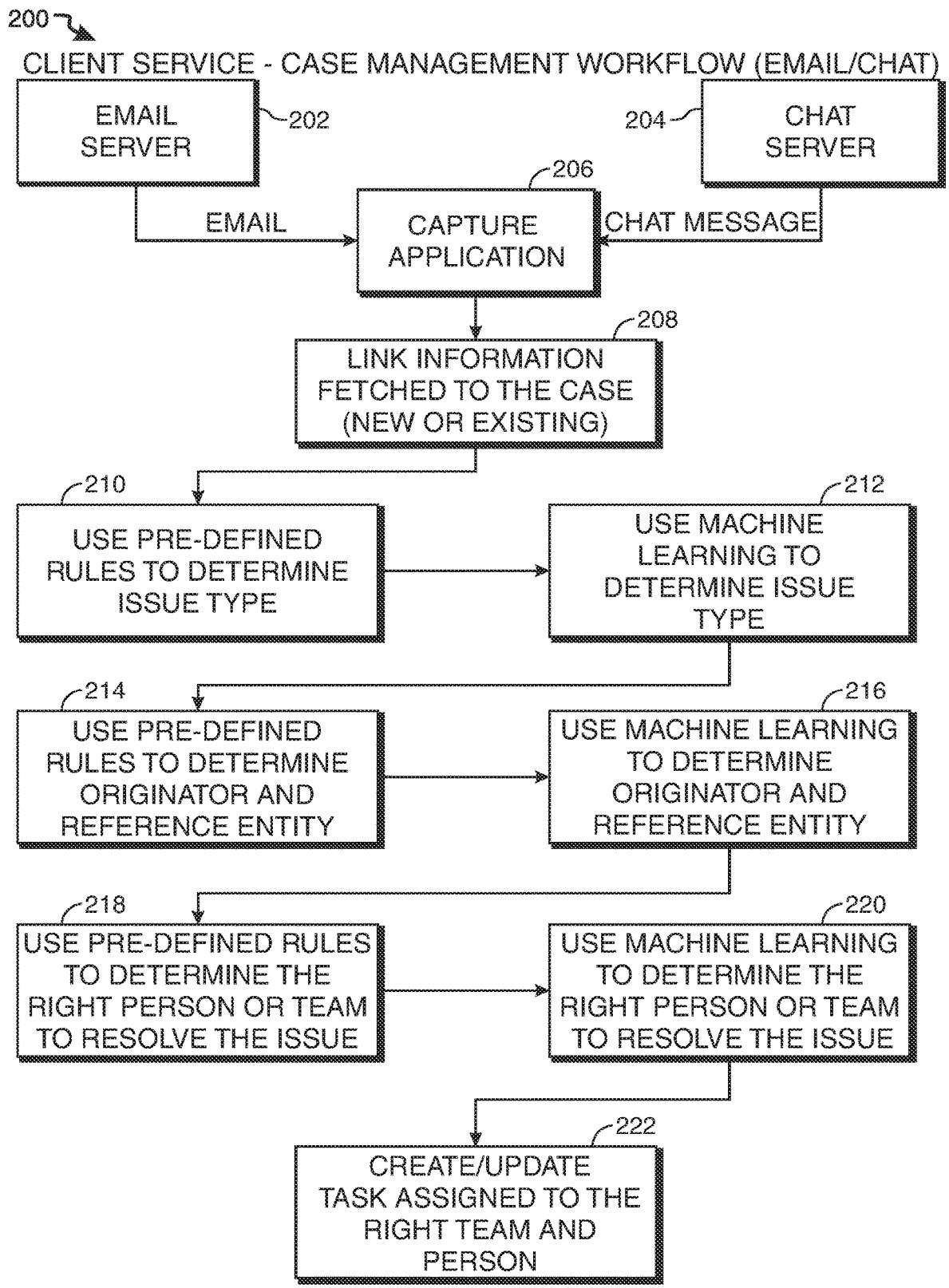
FIG. 2 shows an illustrative flowchart in accordance with principles of the invention.

FIG. 2 shows an illustrative flowchart of a case management workflow 200 in accordance with principles of the invention. The workflow 200 may be associated with a client query received. The client query may be received as an email from an email server, as shown at 202. The client query may be received as a chat from a chat server, as shown at 204.

The data included in the email and/or the chat message may be captured, as shown at 206. The system that may manage the workflow may attempt to link information from the data included in the email and/or chat message in order to identify whether the client query is being received from a new/prospective client or whether the client query is received from an already existing client, as shown at 208. In some embodiments, the system may further be determining whether the client query is associated with a previously received client query or whether the client query is a new query.

In order to identify whether a sender of the client query is an already existing client or not, the system may use pre-defined rules to determine an issue type associated with the client query, as shown at 210. Pre-defined rules may be rules that may be pre-configured within an email server for handling incoming queries. The rules may be pre-set. The rules may enable identifying specific keywords and/or specific email addresses to enable determining the sub-entity to handle the query.

The system may also use machine learning to determine the type of issue, as shown at 212. The system may use both the pre-defined rules and machine learning. The system may use either the pre-defined rules or the machine learning to determine the type of issue.

Following an identification of the type of issue, the system may be configured to determine the originator of the query and the reference entity. The system may use pre-defined rules to determine the originator and reference entity as shown at 214. The system may use machine learning to determine the originator and reference entity as shown at 216.

Following the identification of the originator and reference entity, the system may use pre-defined rules to determine the right person or team to resolve the issue. The system may use machine learning to determine the right person or team to resolve the issue.

When there are no pre-configured rules that enable determining how to handle the query, the system may use machine learning to handle the query. In some embodiments the system may use both pre-defined rules and machine learning to handle the query.

When the query has a known originator, reference entity and is assigned a sub-entity, the system may create a case for the query and/or update an already existing case and transmit it to the sub-entity. The query may be placed in a queue within the sub-entity. The query may be placed in the queue based on a priority level assigned to the query. Once the originator or the query is determined, the system may identify a query previously submitted from the same originator and may determine the query to be a continuation of the previously submitted query. The system may then update the previously submitted query case to include the query and then transmit the query to the sub-entity that may have handled the previously submitted query.

In the event that originator and/or sub-entity are not determined, the system may transmit the query to a general mailbox associated with the entity for further inquiry.

Figure 3:
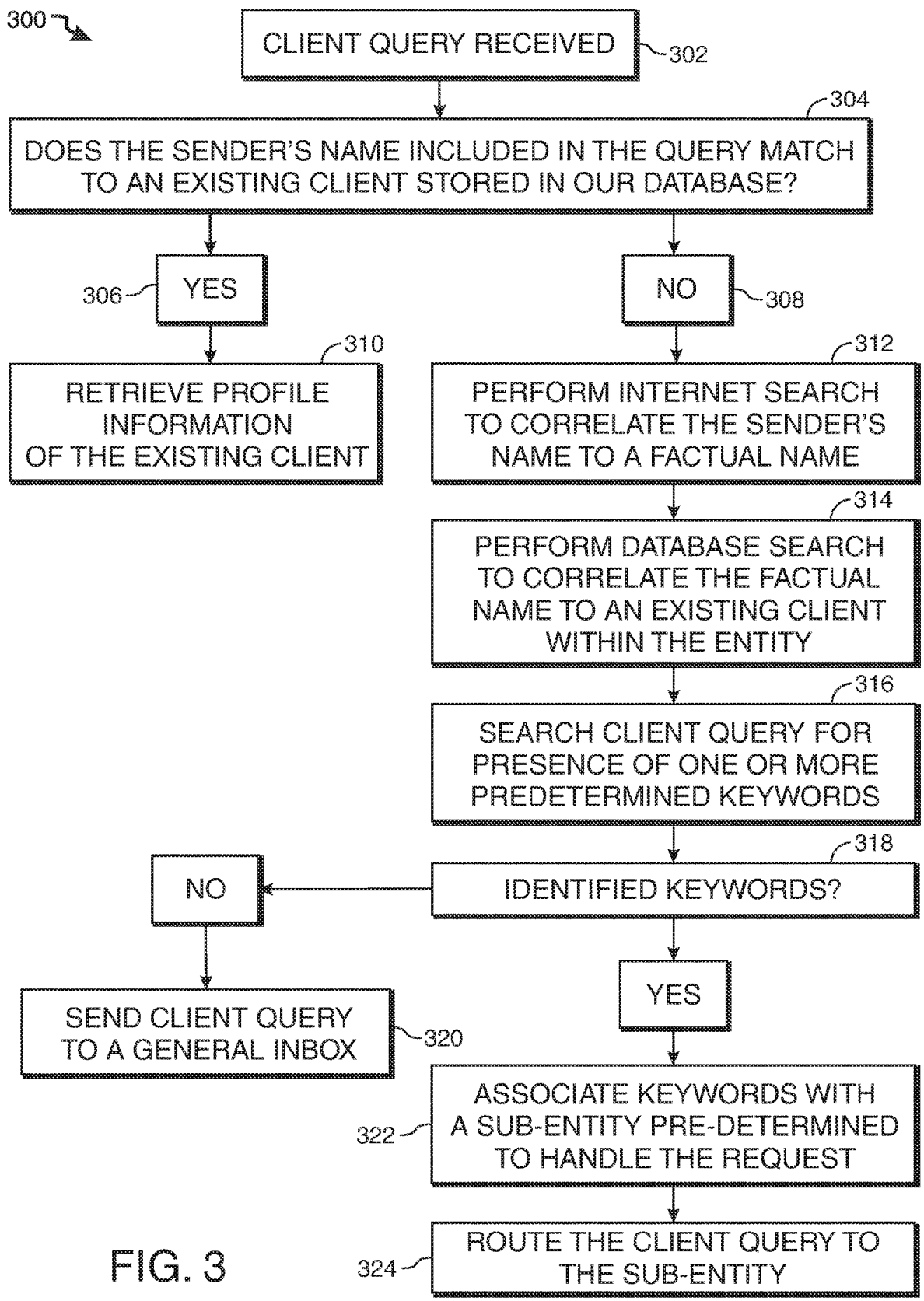
FIG. 3 shows another illustrative flowchart in accordance with principles of the invention.

FIG. 3 shows an illustrative flowchart of a system 300 for managing and routing a client query. System 300 may be configured to receive a plurality of client queries.

A client query may be received at 302. The system may scan a database, as shown at 304, to check if the sender's name included in the client query matches to an existing client stored in the database. When an existing client is found to have a match, as shown at 306, the system may retrieve profile information of the existing client at 310 and use the information associated with the profile to manage the client query.

When the system does not find a match, as shown at 308, the system may be configured to perform an internet search to correlate the sender's name to a factual name, as shown at 312. The system may retrieve the factual name from the internet and perform a database search within the entity's database to identify and correlate the factual name to an existing client within the entity, as shown at 314.

In the event that an existing client is not found that correlates to the factual name, the system may be configured to use additional attributes included in the client query to identify the sender.

Following the identification of the existing client, the system may be configured to search each character string included in the client query for the presence of one or more predetermined keywords, as shown at 316. The system may check whether there are identified keywords, as shown at 318. When predetermined keywords are identified, the system may be configured to associate keywords with a sub-entity pre-determined to handle the type of request included in the client query, as shown at 322. Following the association of the sub-entity to the client query, the system may route the client query to the sub-entity, as shown at 324.

In the event that keywords are not identified, the system may be configured to send the client query to a general inbox within the entity, as shown at 320.

Figure 4:
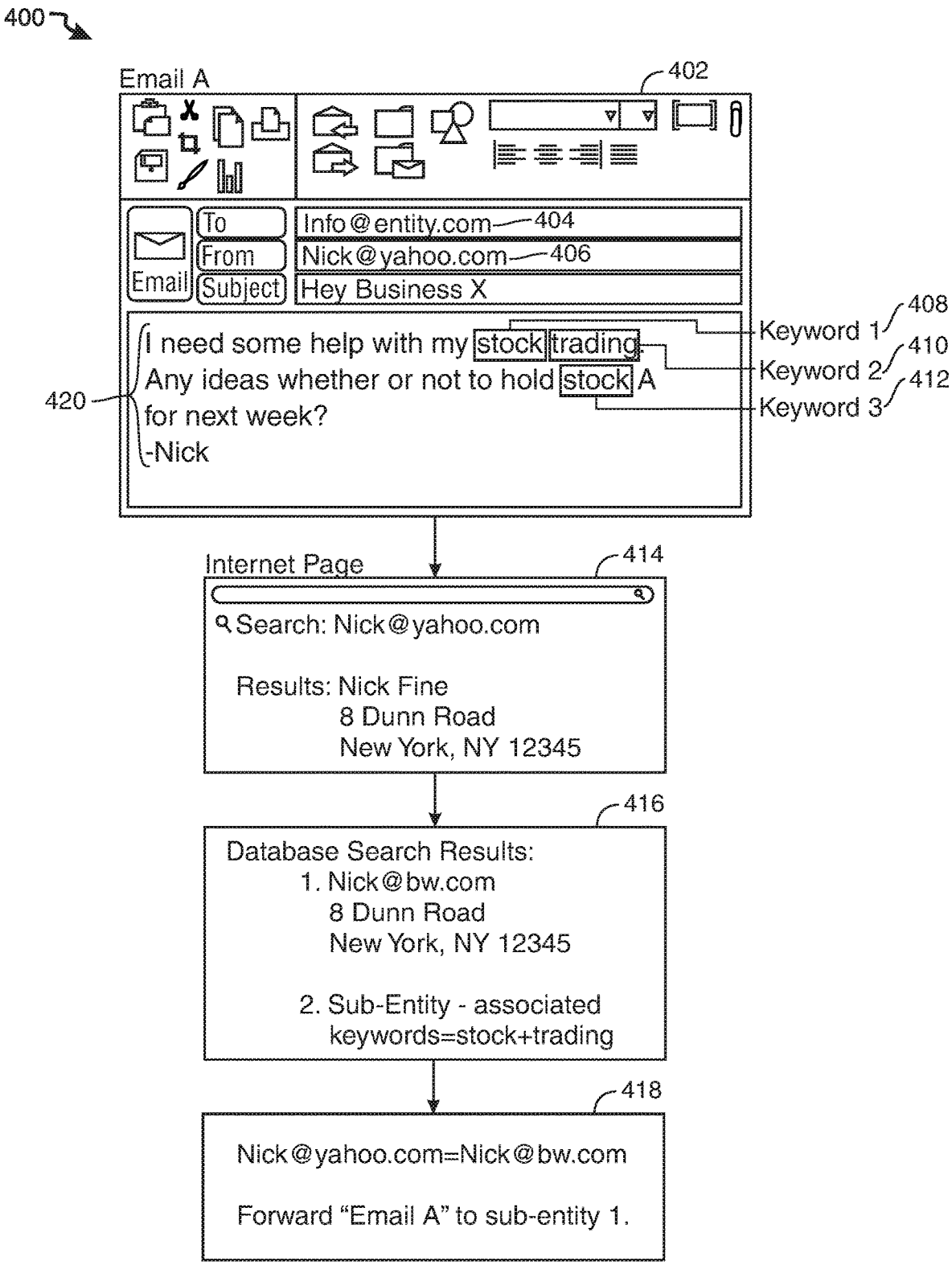
FIG. 4 shows an exemplary diagram in accordance with principles of the invention.

FIG. 4 shows an exemplary diagram 400 in accordance with principles of the invention. In this exemplary diagram 400, a client query may be transmitted to the entity's system. Client query may be transmitted as an e-mail 402. Email 402 may include the sender's e-mail address 406—'Nick@yahoo.com.' The sender may transmit email 402 to the general inbox of the entity with an e-mail address 404—'info@entity.com.' The client query may include a request 420.

The system may need to perform a plurality of actions in order to route the email accurately. The system may extract the sender's email address 406 to determine whether the sender is already an existing client. The system may search a database of existing clients to find a client's profile that may include the sender's electronic address.

In the event that an already existing client with the same email address is identified, the system may review historical queries associated with the existing client in order to route the client query accurately.

In this exemplary diagram 400, when the system does not find an already existing client with the same email address, the system may search the internet to find additional information relating to the sender's email address, as shown at 414. The internet search may return background data associated with the sender of the email address. The background data may include a residing address of the sender associated with the email address.

The system may re-scan the entity's database, using the residing address, to find an existing client with the same address. The results of the database search may be shown at 416. In this example, the identical address was found for an existing client with the email address—'nick@bw.com.' This may indicate that the existing client is the same client as the sender.

When the system finds the existing client with the same address, the system may be configured to update the profile of the existing client to include the sender's email address.

Prior to updating the profile, the system may transmit an authentication message to the existing client in order to validate that the sender is the existing client.

Following the identification of the sender as the existing client, the system may extract the character strings included in the request and identify keywords included in the request. The keywords may be stored in a library within the database and the system may perform a full word search of each keyword against each character string. In this example, the system may identify the keywords 'stock', 'trading' and 'stock.'

The database may include a record of sub-entities and associated keywords. The system may scan the database of the records of sub-entities for a sub-entity that is associated with the identified keywords. In some embodiments, the system may assign the query to the sub-entity that is associated with the keyword 'stock.' In other embodiments, the system may assign the query to the sub-entity that is associated with both keywords 'stock' and 'trading.'

In this example, the system may assign the query to sub-entity 1 that is associated with both keywords, as shown at 416. The system may now forward the client query to sub-entity 1 to handle the query, as shown at 418.

Figure 5:
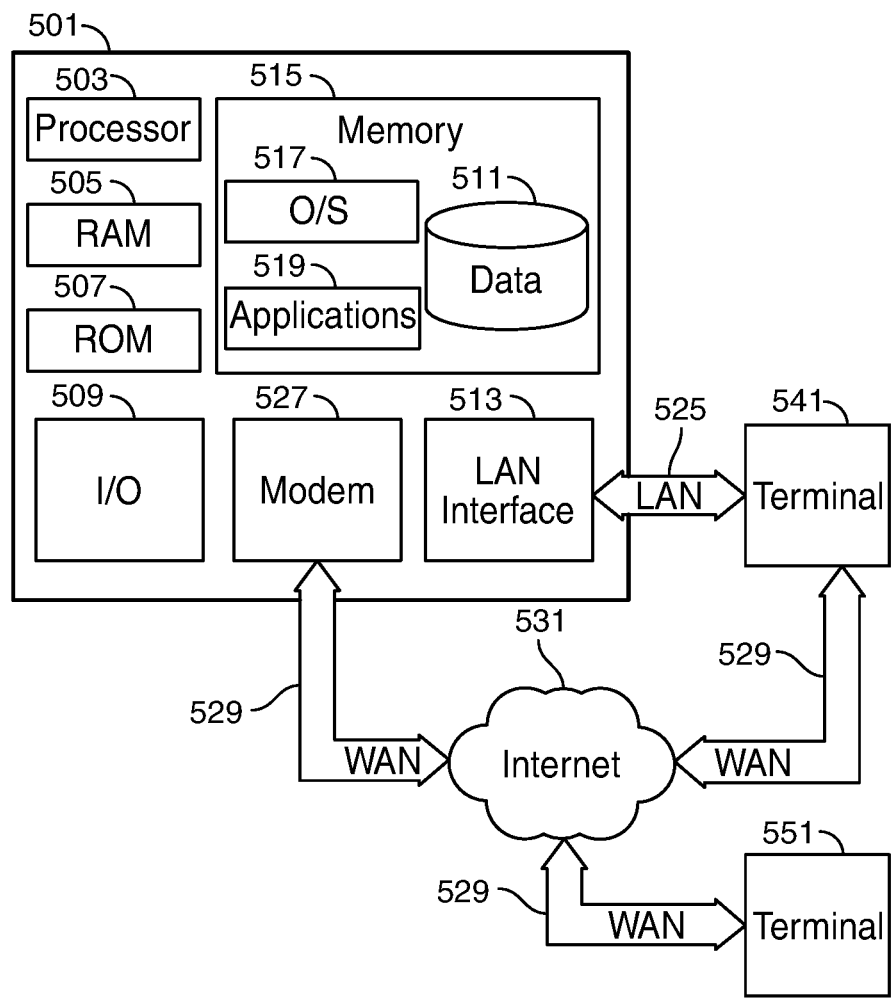
FIG. 5 shows illustrative apparatus that may be used in accordance with principles of the invention.

FIG. 5 is a block diagram that illustrates a computing server 501 (alternatively referred to herein as a "server or computer") that may be used in accordance with the principles of the invention. The computer server 501 may have a processor 503 for controlling overall operation of the server and its associated components, including RAM 505, ROM 507, input/output ("I/O") module 509, and memory 515.

I/O module 509 may include a microphone, keypad, touchscreen and/or stylus through which a user of server 501 that may provide input, and may also include one or more of a speaker for providing audio output and a video display device for providing textual, audiovisual and/or graphical output. Software may be stored within memory 515 and/or other storage (not shown) to provide instructions to processor 503 for enabling server 501 to perform various functions. For example, memory 515 may store software used by server 501, such as an operating system 517, application programs 519, and an associated database 511. Alternatively, some or all of computer executable instructions of server 501 may be embodied in hardware or firmware (not shown).

Server 501 may operate in a networked environment supporting connections to one or more remote computers, such as terminals 541 and 551. Terminals 541 and 551 may be personal computers or servers that include many or all of the elements described above relative to server 501. The network connections depicted in FIG. 5 include a local area network (LAN) 525 and a wide area network (WAN) 529, but may also include other networks.

When used in a LAN networking environment, server 501 is connected to LAN 525 through a network interface or adapter 513.

When used in a WAN networking environment, server 501 may include a modem 527 or other means for establishing communications over WAN 529, such as Internet 531. Internet 531 may be included in network N (shown in FIG. 1).

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 519, which may be used by server 501, may include computer executable instructions for inventory management, inventory mapping, item tracking, item ordering and data record merging applications.

Computing server 501 and/or terminals 541 or 551 may also be mobile terminals including various other components, such as a battery, speaker, and antennas (not shown). Terminal 551 and/or terminal 541 may be portable devices such as a laptop, tablet, smartphone or any other suitable device for receiving, storing, transmitting and/or displaying relevant information.

Any information described above in connection with database 511, and any other suitable information, may be stored in memory 515. One or more of applications 519 may include one or more algorithms and/or perform any other suitable tasks.

The apparatus and methods may be operational with numerous other general purpose or special purpose computing system environments or configurations. Examples of well-known computing systems, environments, and/or configurations that may be suitable for use with the apparatus and methods include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The apparatus and methods may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 6:
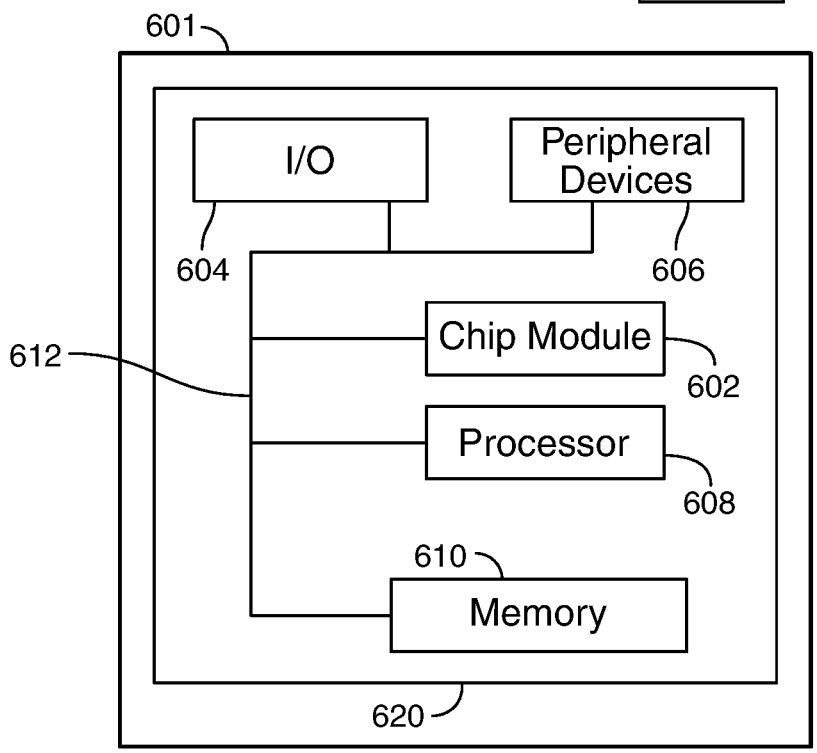
FIG. 6 shows illustrative apparatus that may be used in accordance with principles of the invention.

FIG. 6 shows an illustrative apparatus 601 that may be configured in accordance with the principles of the invention.

Apparatus 601 may be a computing machine. Apparatus 601 may include one or more features of the apparatus that is shown in FIG. 5.

Apparatus 601 may include chip module 602, which may include one or more integrated circuits, and which may include logic configured to perform any other suitable logical operations.

Apparatus 601 may include one or more of the following components: I/O circuitry 604, which may include a transmitter device and a receiver device and may interface with fiber optic cable, coaxial cable, telephone lines, wireless devices, PHY layer hardware, an keypad/display control device or any other suitable encoded media or devices; peripheral devices 606, which may include counter timers, real-time timers, power-on reset generators or any other suitable peripheral devices; logical processing device 608, which may compute item data record elements, customer order information, inventory weight distribution, efficient shifting of mechanisms for desirable dispensing manners, and perform other methods described herein; and machine-readable memory 610.

Machine-readable memory 610 may be configured to store data records in machine-readable data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

Thus, methods and apparatus for managing and routing client queries within an entity are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for managing and routing client queries within an entity, the method comprising:
    receiving a client query comprising:
        an email address associated with a sender of the client query;
        a request including character strings; and
        one or more attributes including an internet protocol ("IP") address of the sender, a domain name and one or more additional email addresses included in the client query;
    searching in a database for query history correlating to the email address;
    in response to determining that no query history exists with respect to the email address, performing a sequence of actions to identify the sender of the client query and to identify a sub-entity for handling the client query, the sequence of actions comprising:
        for identifying the sender of the client query:
            searching the internet for identifying a factual name that correlates to the email address and a residing address that correlates to the email address;
            identifying the factual name correlating to the email address and the residing address correlating to the email address;
            in response to the identifying, searching the entity database for an existing client that matches the factual name and comprises the residing address;
            in response to the searching, identifying the existing client;
            transmitting a notification to the existing client comprising a name of the sender and the email address associated with the sender, and a request for an authentication password associated with an account of the existing client;
            receiving the authentication password;
            in response to authenticating the authentication password received from the existing client, confirming the sender as the existing client; and
            updating a profile of the existing client to include the email address associated with the sender of the client query; and
        for identifying the sub-entity:
            using a full word search to compare each keyword stored in a classification model against each of the character strings to find an exact match, the exact match being a first character string identical to a first keyword stored in the classification model;
            identifying the exact match;
            following identifying the exact match, searching the client query, using regular expression searching, to identify a non-exact match between the first keyword and a second character string, the second character string including the first keyword and one or more additional characters;
            storing the first character string and the second character string in a first dataset; and
            identifying, from a sub-entity database storing a list of sub-entities, a sub-entity associated with the first keyword, wherein, in the sub-entity database, each of the sub-entities is associated with one or more keywords;
    following the identification of the sub-entity and the sender, transmitting the client query to the sub-entity to handle the request; and
    prioritizing the client query from amongst a plurality of client queries based on a time-sensitivity of the client query and a priority level of the existing client.

2. The method of claim 1 wherein the client query is an email.

3. The method of claim 1 wherein the client query is a chat message.

4. The method of claim 1 wherein, following the identification of the first keyword being identical to the first character string, the method further comprises identifying a plurality of keywords identical to a plurality of character strings comprised in the client query.

5. The method of claim 4 further comprising:
    identifying a sub-entity within the sub-entity database associated with a greatest amount of identical keywords; and
    transmitting the client query to the sub-entity with the greatest amount of identical keywords.

6. The method of claim 1 wherein, following the identification of the sender, the method further comprises:
    scanning the database for a historic query that comprises an amount of character strings being identical to an amount of character strings in the client query, the amount of identical character strings being greater than a pre-determined threshold amount; and
    automatically routing the client query to a sub-entity that handled the historic query.

7. A method for managing and routing client queries within an entity, the method comprising:
    receiving a plurality of client queries, each client query comprising a request including character strings and origination identification data associated with a sender of the client query;
    identifying an existing client associated with the origination identification data; and
    for each client query:
        using a full word search to compare each keyword, from within a library of previously stored keywords, against each character string comprised in the request to find an exact match, the exact match being a first character string identical to a first keyword stored in the library;
        identifying the exact match;
        following the identifying, searching, using regular expression, for non-exact matches between the first keyword and additional character strings, the additional character strings including the first keyword and one or more additional characters;
        storing the first character string and the additional character strings in a first dataset;

identifying, from a sub-entity database storing a list of sub-entities, a sub-entity associated with the first keyword, wherein, in the sub-entity database, each of the sub-entities is associated with one or more keywords;

assigning the sub-entity for handling the request associated with the client query; and prioritizing a location of the client query, based on a time-sensitivity of the client query and a priority level of the existing client, the client query from amongst a plurality of client queries within a queue, the prioritizing for receiving a response from the sub-entity, the prioritizing comprising:

searching the client query for a date included in the client query that is before a predetermined future date;

identifying a predetermined status of the client;

when the date is not identified, prioritizing the location based on the predetermined status of the client; and when the date is identified, prioritizing the location based on the date.

8. The method of claim 7 wherein the predetermined status of the client comprises one of a first tier client and a second tier client and when the date is after the predetermined future date, the method comprises assigning a higher priority level to the client queries received from the first tier clients and a lower priority to the client queries received from the second tier clients.

9. The method of claim 8 wherein when the date is equal to or before the predetermined future date, the method comprises assigning the higher priority level to the client queries received from the first-tier clients and from the second-tier clients.

10. A client case management system for managing client requests, the client case management system comprising:

a receiver configured to receive a client query comprising:
one or more attributes including an internet protocol ("IP address") of the sender, a domain name and one or more email addresses included in the client query; and
a request including character strings;

a processor configured to:
extract an email address associated with a sender of the client query;
search in a database for query history correlating to the email address;
determine that no query history exists with respect to email address; and
in response to determining that no query history exists with respect to the email address, performing a sequence of actions to identify the sender of the client query and to identify a sub-entity for handling the client query, the sequence of actions comprising:
for identifying the sender of the client query:
search the Internet for identifying a factual name that correlates to the email address and a residing address that correlates to the email address;
identify the factual name correlating to the email address and the residing address correlating to the email address;
in response to the identifying, search the entity database for an existing client that matches the factual name and comprises the residing address;
in response to the searching, identify the existing client;
transmit a notification to the existing client comprising a name of the sender and the email address associated with the sender, and a request for an authentication password associated with an account of the existing client;
receive the authentication password;
in response to authenticating the authentication password received from the existing client, confirm the sender as the existing client; and
update a profile of the existing client to include the email address associated with the sender of the client query; and
for identifying the sub-entity:
search, using a full word search, to compare each keyword stored in a classification model against each character string to find an exact match, the exact match being a first character string identical to a first keyword stored in the classification model;
identify the exact match;
following identification of the exact match, search, using regular expression, to identify a non-exact match between the first keyword and a second character string, the second character string including the first character string and one or more additional characters;
store the first character string and the second character string in a first dataset; and
identify, from a sub-entity database storing a list of sub-entities, a sub-entity associated with the first keyword, wherein, in the sub-entity database, each of the sub-entities is associated with one or more keywords; and a transmitter configured to:
following the identification of the sub-entity and the sender, transmit the client query to the sub-entity to handle the request; and
prioritize the client query from amongst a plurality of client queries based on a time-sensitivity of the client query and a priority level of the existing client.

11. The system of claim 10 wherein the client query is an email.

12. The system of claim 10 wherein the client query is a chat message.

13. The system of claim 10 wherein, following the identification of a first keyword being identical to a first character string, the processor is further configured to identify a plurality of keywords identical to a plurality of additional character strings comprised in the client query.

14. The system of claim 13 wherein the processor is further configured to:
identify a sub-entity within the sub-entity database associated with a greatest amount of identical keywords; and
transmit the client query to the sub-entity to handle the request.

* * * * *